United States Patent [19]

Best

[11] Patent Number: 5,363,567
[45] Date of Patent: Nov. 15, 1994

[54] SELF INCINERATING OVEN AND PROCESS CARRIED OUT THEREBY

[75] Inventor: Willie H. Best, Columbia, S.C.

[73] Assignee: Thermal Engineering Corp., Columbia, S.C.

[21] Appl. No.: 850,111

[22] Filed: Mar. 10, 1992

Related U.S. Application Data

[63] Continuation-in-part of Ser. No. 702,109, May 15, 1991, Pat. No. 5,230,161, which is a continuation of Ser. No. 329,891, Mar. 28, 1989, abandoned.

[51] Int. Cl.[5] .............................................. F26B 21/06
[52] U.S. Cl. ............................................ 34/271; 34/79
[58] Field of Search .................... 34/79, 39, 40, 41; 432/31, 72, 147, 148, 209

[56] References Cited

U.S. PATENT DOCUMENTS 3,706,445 12/1972 Gentry ................................ 34/79

FOREIGN PATENT DOCUMENTS 580423 11/1977 U.S.S.R. ............................. 34/40

Primary Examiner—Henry A. Bennet
Attorney, Agent, or Firm—Hopkins & Thomas

[57] ABSTRACT

The self incinerating oven has a housing provided with opposed radiant walls which define an oven cavity. Each radiant wall is heated by heated air from a combustion chamber. Polluted air, containing volatile, organic compounds (VOC's), from the drying of painted objects in the oven cavity, is directed from the oven cavity, through ducts to suspended, recuperative, heat exchanger tubes in the incineration chamber. The preheated, polluted air, at 800° F.–1000° F. emerging from the heat exchanger, is discharged adjacent to a linear gas burner, in the combustion chamber. The VOC's are burned by the burner and part of the heated air and products of combustion are directed to heat one of the radiant walls.

39 Claims, 6 Drawing Sheets

SELF INCINERATING OVEN AND PROCESS CARRIED OUT THEREBY

REFERENCE TO RELATED APPLICATIONS

This is a continuation-in-part of my application Ser. No. 07/702,109 filed May 15, 1991, now U.S. Pat. No. 5,230,161, which was a continuation of application Ser. No. 07/329,891, filed Mar. 28, 1989, now abandoned, entitled APPARATUS AND PROCESS FOR GENERATING RADIANT ENERGY.

BACKGROUND OF THE INVENTION

1. Field of the Invention

This invention relates to a self incinerating oven and process carried out thereby and more particularly to an apparatus and method by which the volatile organic compounds generated during the curing process of various coatings, can be converted to harmless products of combustion within the structure of a radiant oven, while, at the same time, utilizing the energy contained in the discharged gases from the incineration process to heat the radiation emitting wall of the oven.

2. Description of the Prior Art

Volatile organic compounds (VOC's) are generated in the curing processes of many coatings on surfaces, such as on the surfaces of vehicle bodies.

In most industrial applications, the oven exhaust, containing these VOC's, is collected and ducted to a common incinerator. Usually, one central incinerator is used to incinerate the exhaust from multiple ovens. Sometimes as many as ten ovens are involved. There are many disadvantages to the central type of incinerator that is used to incinerate the exhaust from multiple processes.

The most common problem associated with a central incinerator system is the complex duct work required to accumulate the exhaust from multiple ovens and to transport it to a central incinerator. Because of the excess energy generated from the incineration process, additional high temperature ducts are then required to distribute the high temperature gases back into processes which can utilize the energy. In most industrial application, where the source of the VOC's are from oven exhaust, the excess energy from the incinerator is used to provide a portion or all of the heat for the ovens. Because of the high temperature of the gases discharged from the incinerator, in many industrial applications, heavily insulated, seam welded duct work, for distributing the high temperature gases are used.

If the high temperature gases are to be used to heat ovens, usually different oven zones will require different amounts of energy. Therefore, it has become necessary to control the volume of high temperature air to each oven zone through high temperature dampers and control systems. Leakage is a common problem with high temperature dampers and, in general, the construction of the high temperature ducts is more complex and costly than is required for lower temperature air (under 500° F.).

Central incinerators require valuable industrial floor space and the complex duct distribution system associated with a central incinerator require valuable space, and certainly clutters the area.

Another common problem with a central incinerator on which multiple processes are dependent, is that a major portion of a finishing line can be disrupted due to a central incinerator failure.

The concentration of VOC's contained in the air expelled from ovens used for drying or curing various types of coatings, is usually much below a concentration required for producing a combustible mixture or even for the lower explosion limit (LEL).

Therefore, these VOC's have to be oxidized to harmless gases by incineration. They cannot be converted to products of combustion simply by being burned because of their low concentration in the mixture. However, when these compounds are exposed to an increased temperature for a sufficient time in the presence of oxygen, they can be oxidized into harmless products of combustion. This process is usually accomplished at temperatures of between 1250° F. and 1500° F. and with dwell times for the organic matter from 0.2 seconds to 1 second.

With ovens, where incineration of the VOC's are required, the temperature of the mixture containing the VOC's is relatively low, 250° F. to 350° F., compared to the temperature required for oxidation of the VOC's. Therefore, in order to conserve energy, most incinerators that are remote from the oven are of the recuperative type which allow for pre-heating the incoming mixture containing VOC's by the hot gases generated from the incineration process. Therefore, the energy added to accomplish the incineration can be greatly reduced if the incoming mixture can be separated from the combustion gases and pre-heated normally to 800° F.–1000° F. If pre-heating can be accomplished to this temperature, then the energy added to the mixture to be incinerated is only that required to heat the mixture 800° F.–1000° F. to the incineration temperature, which is usually in the range of 1250° F. to 1500° F.

In order to pre-heat the incoming mixture containing the VOC's, some type of air-to-air heat exchanger is required. A typical heat exchanger used for this application would employ tubular heat transfer surfaces which could be constructed in many geometries. Most practical heat exchangers of this type use either cylindrical or rectangular tubular heat transfer surfaces.

In conventional incinerators employing pre-heating, it would not be desirable to mix the incoming polluted air mixture with the relatively clean air from the incineration process. Therefore, the heat exchanger has required gas tight seals to prevent the intermixing of the two. This gas tight seal is usually produced by welding the heat transfer tubular surfaces into headers. In many designs, the tube headers, in which the heat transfer tubes are welded, are exposed to the high exhaust gas temperatures of the incinerator. Failure of these welds and the heat exchangers associated with these types of incinerators have been a common problem in the past. Also, the failure of these heat exchangers has created expensive repairs.

A problem associated with the type of heat exchangers described above is that the resulting structure must provide for the expansion and contraction of the multiple tubes contained within one heat exchanger when different tubes are exposed to different temperatures. Carbide precipitation within the weld, is another problem in prior art devices and in many instances, the weldment is subjected to high stresses as a result of the expansion and contraction of the heat transfer tubes.

Attempts have been made, in the past, to only weld one end of each heat transfer tube into one of the tube plates and allow the other end to float in the other tube plate. While this concept does provide for expansion and contraction of the tubes, it adds another design problem of providing a means to seal each tube while it expands and contracts within the tube plate. Thus, these types of incinerators have not been satisfactory or widely accepted because of leakage at the seal.

The present invention overcomes the difficulties prescribed above by providing an inexpensive and yet quite durable and efficient oven containing an incinerator or combustion chamber which achieves virtually 100% destruction of VOC's. I have also found that it is not necessary to provide a specific dwell time for the polluted air in the combustion chamber at a specific constant elevated temperature. In other words, the mixture of incoming air and VOC's does not have to be held at a specified constant temperature before it enters the primary heat exchanger. The rate at which the VOC's are oxidized depends upon, among other things, the temperature of the mixture. Thus, the dwell time required will depend upon the temperature versus time relationship experienced by the mixture as it passes through the combustion chamber.

In the preferred embodiment of this invention, air is circulated from an oven into a primary heat exchanger contained within the confines of an incineration chamber and is preheated before it is discharged from the heat exchanger tube into the incinerator chamber. The VOC's are then converted to products of combustion in the presence of oxygen at a sufficient temperature and time for this oxidation to occur. The hot gases from the incineration process is then used to provide the primary heat energy to a radiant wall for transferring heat to objects passing through the oven. This concept provides for an efficient method for the destruction of essentially 100% of the VOC's while at the same time insuring sufficient heat energy for the oven.

SUMMARY OF THE INVENTION

Briefly described, the present invention includes a drying oven, used primarily for drying wet paint on automobile parts, or other objects which are passed through the oven and between a pair of opposed concaved radiant walls which define, therebetween, a central oven cavity within which the automobile parts or other objects are successively passed for drying.

Air is withdrawn by an exhaust fan or fans from the oven cavity, this withdrawn air containing, entrained therewith, volatile organic compounds (VOC's) which are to be subsequently incinerated. This polluted air is delivered by the exhaust blower or fan to headers which are located outwardly of the radiant walls of the oven, the header on each side delivering this polluted air to a plurality of downwardly extending heat exchangers contained in a combustion chamber which extends along the length of each radiant wall. These heat exchangers are individual, preferably rectangular tubes, the discharge ends of which are in a common, horizontal plane and extend over substantially the entire length of a linear burner (which is preferably constructed in accordance with my U.S. Pat. No. 5,062,788).

In the preferred embodiment, the linear burner is disposed wholly within the combustion chamber, except for that portion which extends outside the housing, to supply gas and air to the burner. The combustion chamber is a narrow, upwardly extending chamber defined by high temperature insulation material which will withstand approximately 3000° F. The inner surfaces of the insulation material form radiant emitters for directing radiant heat inwardly against the heat exchanger. The gases of combustion emanating from the burner and which are commingled with the polluted air discharged toward the flames of the burner, heat both the heat exchanger tubes and the inner surfaces of the insulation material, whereby the insulation material radiates radiant energy toward the surfaces of the heat exchanger tubes. The absorption of the infrared radiant energy into the surface of the heat exchanger can be improved by coating the outside of the wall of the tube with a high temperature coating possessing a high emissivity, such as porcelain enamel. These heated gases thus heat the tubes in counter current flow by convection and the emitters formed by the surfaces of the insulation materials heat the heat exchanger tubes by radiation. The temperature within the combustion chamber or incineration chamber is sufficiently high, usually being between 1250° F. and 1500° F., to oxidize the VOC's and to heat the polluted air in the heat exchanger tubes to 800° F.–1000° F. as the polluted air is discharged from the lower ends of the heat exchanger tubes. The hot gases, passing from the combustion chamber, pass into a plenum chamber above the combustion chamber, providing heat for preheating the polluted air in the header, disposed therein. Thence, the gases of combustion and air pass upwardly into an upper plenum or cavity where the gases are selectively discharged by a bypass duct to the atmosphere or to some other installation which can use the heated air. A part of the heated air, however, is directed through a downwardly extending conduit along one side of the incinerator or combustion chamber so the heated gases from the upper plenum are fed into a heating chamber for heating the radiant walls of the oven cavity. The heated gases are introduced at the bottom part of the heating chamber and pass upwardly through the progressively narrowing, arcuate passageway of the heating chamber and are discharged into a longitudinally extending exhaust plenum located in the upper portion of the upper plenum chamber. Thence, the air which has heated the radiant wall of the oven cavity, pass outwardly through an exhaust opening, being exhausted therefrom by an exhaust blower or is discharged through a gravity stack.

An air supply blower supplies, through a filter, fresh air which forms the make-up air for the oven cavity. This make-up air travels along the inner surfaces of the panels defining the outer housing so as to cool the outer housing and pick up heat from the insulation material, before it is discharged through ports below the opposed, concaved, radiant walls of the oven cavity.

The process carried out by the present invention includes the progressive withdrawal of polluted air from an oven cavity, and discharging the polluted air from an oven cavity through a plurality of suspended heat exchanger tubes in the combustion chamber and down onto the flames of a linear burner disposed in a combustion chamber along with the heat exchanger tubes. The polluted air discharged in a downward direction commingles with and is oxidized by the products of combustion and the flames of the linear burner and are progressively discharged upwardly along the surfaces of the combustion chamber so as to heat the surfaces of the combustion chamber and heat the tubes of the heat exchanger, whereby the walls of the combustion chamber radiate radiant heat inwardly toward the tubes of the combustion chamber. The hot gases emanating from the combustion chamber are selectively channeled to heat the walls of the oven cavity or are selectively discharged from the incineration chamber. The make-up air which is introduced between the outer walls of the oven and the insulation walls of the oven travel downwardly between these two walls for the entire length of the oven, substantially reducing the outside temperature of the housing. The air then is directed through ducts and discharged through high temperature filters throughout the length of the oven.

By controlling the volume of the make-up air for a fixed volume of the exhaust air, the pressure within the oven cavity is selectively maintained at a neutral, positive, or even a negative pressure compared to the pressure outside the oven.

Accordingly, it is an object of the present invention to provide a drying oven which is capable of simultaneously drying objects within the oven and incinerating the volatile organic compounds which are released by the coatings on the objects being dried.

Another object of the present invention is to provide an apparatus and process for drying objects wherein the volatiles which are generated by the drying process carried out by the apparatus, are incinerated so as to generate heat which is then used to heat the walls of the oven.

Another object of the present invention is to provide a self incinerating oven that will eliminate duct work required to interconnect the exhaust of an oven with the intake of a remote incinerator.

Another object of the present invention is to provide an incinerating oven that requires less floor space than would normally be required by an oven and a separate incinerator capable of incinerating the volatile organic compounds generated by the oven.

Another object of the present invention is to provide, in a radiant wall oven, a system which will maintain a constant, prescribed wall surface temperature.

Another object of the present invention is to provide a self incinerating oven which is modular in design and which essentially eliminates the field work necessary to install the conventional incinerators and ovens and reduce to a minimum the installation work required to install the present oven.

Another object of the present invention is to provide a self incinerating oven which will effectively use the hot gases discharged from the incinerator to heat radiant walls which dry objects passed through the oven and which will utilize the VOC's contained in the polluted air withdrawn from the oven for generating a portion of this heat.

Another object of the present invention is to provide in a self incinerating oven, an incinerator which will reduce to a minimum the conversion of nitrogen to nitrogen oxides ($NO_x$).

Another object of the present invention is to provide a self incinerating oven which is inexpensive to manufacture, durable in structure and efficient in operation.

Another objection of the present invention is to provide a self incinerating oven in which the combustion process for oxidizing the VOC's occurs over the entire length of the oven to provide a dwell time for the VOC's sufficient to enable the complete oxidization of the VOC's to harmless products of combustion.

Another object of the present invention is to provide a self incinerating oven in which the polluted air is directed into an incineration or combustion chamber and exposed to incineration temperatures for a sufficient time that they are oxidized into harmless exhaust products.

Another object of the present invention is to provide a self incinerating oven wherein the heat exchangers which are employed for the incineration of the polluted air, are free floating and free to expand and contract within an incineration or combustion chamber.

Another object of the present invention is to provide a self incinerating oven in which the drying of object within the oven, the incineration of the VOC's emanating from the oven and generation of heat necessary for heating the walls of the oven are simultaneously achieved along the length of the oven.

Another object of the present invention is to provide a method and apparatus for simultaneously incinerating the volatiles emanating from the oven and heating the oven.

Another object of the present invention is to provide for selectively controlling the air fed to the oven cavity of an oven and selectively controlling the heated air used for heating the oven.

Another object of the present invention is to provide a self incinerating oven in which the objects to be dried are progressively heated by radiant heat and the polluted air withdrawn from the drying objects is progressively incinerated.

Another object of the present invention is to provide a self incinerating oven which is modular in design and which is capable of being combined with other similar modules to produce an oven of the appropriate length.

Another object of the present invention is to provide a self incinerating oven in which the polluted air which is circulated through the system has a relatively low pressure drop in being incinerated and reintroduced for heating the walls of the incinerator.

Another object of the present invention is to provide a self incinerating oven which has a high efficiency and a long, useful life, and is made up of components which are readily and easily replaced.

Another object of the present invention is to provide a self incinerating oven in which the burner is easily accessible and requires little maintenance.

Another object of the present invention is to provide a self incinerating oven and process of destroying VOC's in a drying oven, in which the incineration can destroy essentially 99%+ of the VOC's.

Another object of the present invention is to provide a self incinerating drying oven which has excellent heat transfer characteristics.

Another object of the present invention is to provide a drying oven in which the nitrogen oxides (NO,) are reduced to a minimum.

Other objects, features, and advantages of the present invention will become apparent from the following description when considered in conjunction with the accompanying drawings wherein like characters of reference designate corresponding parts throughout the several views.

DETAILED DESCRIPTION

Referring now in detail to the embodiments chosen for the purpose of illustrating the present invention, numeral 10 denotes generally the seam welded, housing or shell of the oven, the housing having spaced, opposed side panels, such as side panel 11 and spaced, opposed end panels, such as end panel 12. These end panels 12 are provided for both ends on each side of the oven.

Figure 1:
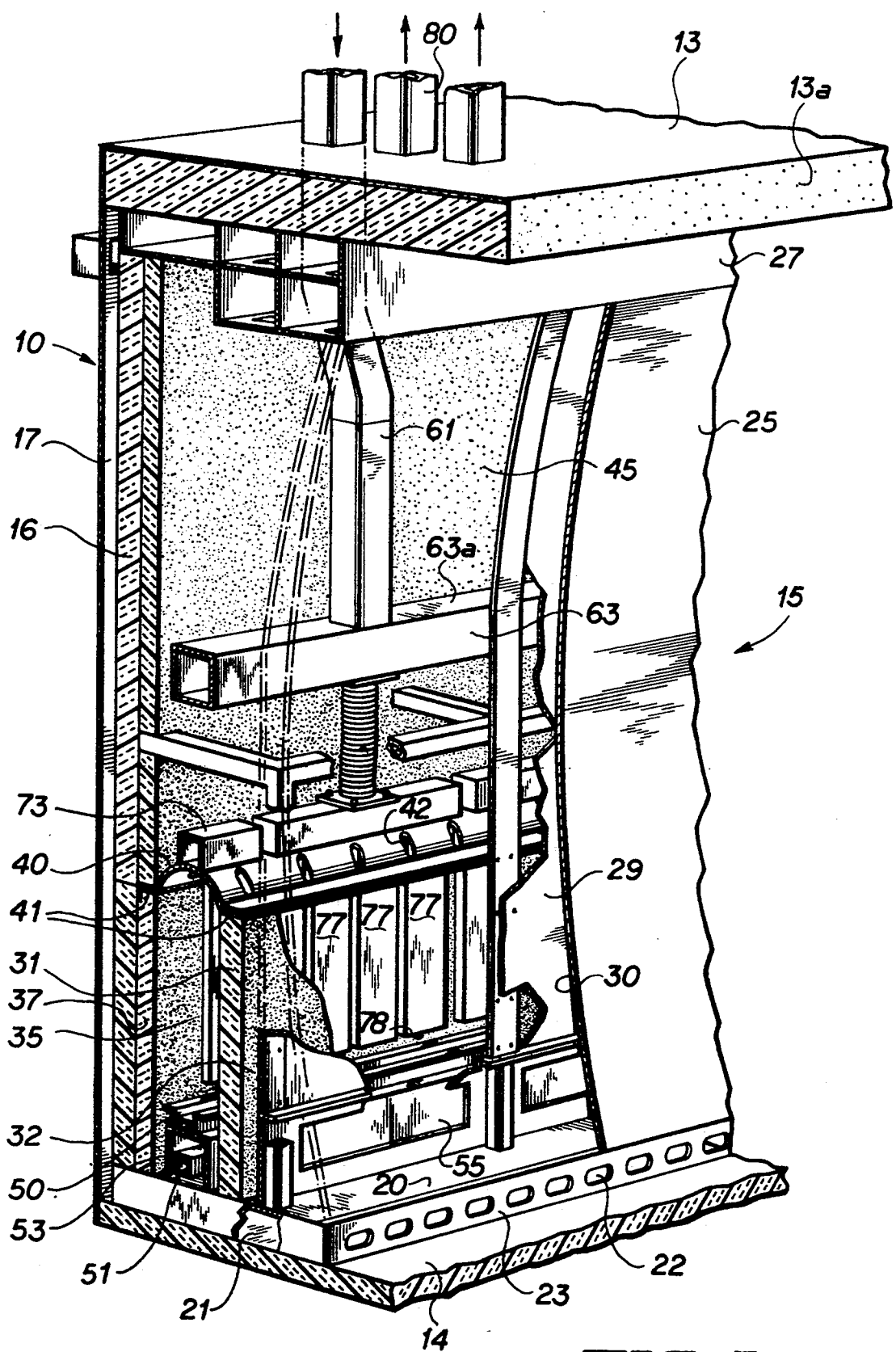
FIG. 1 is a fragmentary perspective view of a self incinerating oven constructed in accordance with the present invention.
Figure 4:
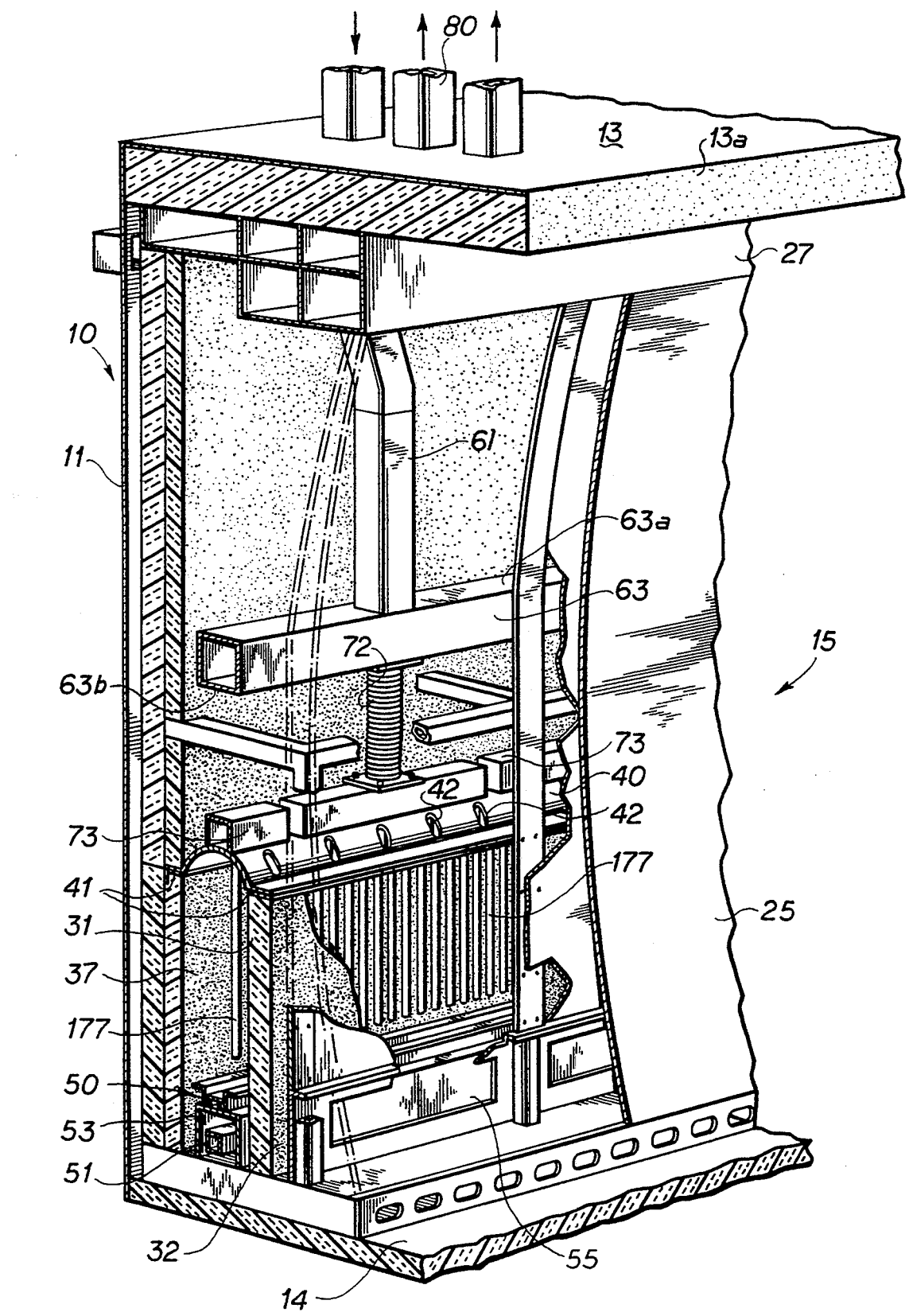
FIG. 4 is a view similar to FIG. 1 and showing a modified form of heat exchanger tubes, therein.

In will be understood that because both side sections of the oven are identical, only a single side section is shown in FIGS. 1 and 4. The other side section (not shown) is identical to the side wall portion shown in FIG. 2.

In more detail, the housing has a top plate 13 having an insulation panel 13a. The housing also has a bottom 14 formed of insulation material. The bottom plate 14, the top plate 13, and top insulation panel 13a extend across an oven chamber, denoted generally by the numeral 15, so as to form the top panels 13, 13a, and bottom 14 of the opposed side section (not shown).

Spaced inwardly from the side panel 11 is an inner insulation panel 16 which is supported in a stationary, vertical position, inwardly parallel to the housing panel 11 so as to define an open space which provides a passageway 17 for fresh air supplied by a blower 18 attached to panel 11.

Spaced inwardly or upwardly from the bottom panel 13 is a floor plate 20 which is parallel to the bottom panel 14 so as to provide a second passageway 21 which communicates with the passageway 17 throughout the longitudinal length of the passageway 17. Thus, both passageways 17 and 21 are relatively long and narrow passageways through which air is supplied to a plurality of ports 22 in a front bottom plate 23.

Each side section includes a curvilinear radiant wall 25 which extends substantially the entire height of the oven. This curvilinear wall 25 extends throughout the length of the oven and is substantially higher and longer than any object which is passed through the oven cavity 15. The wall 25 is heated sufficiently to radiate thermal energy in converging paths toward successive objects (not shown) to be dried. The radiant wall 25 is steel and preferably is provided with a coating of porcelain throughout its entire concaved inner surface area. The radiant wall 25 is suspended by a front plate of an exhaust plenum 27. The curvature of the radiant wall 25 is about a single horizontal longitudinally extending axis or several horizontal longitudinally extending axes preferably within the oven cavity 15. This configuration will depend upon the desired configuration and where the heat is to be concentrated. In any event, the axes or axis of the curvature is above the bottom plate 14 and usually below the top plate or panel 13.

Within the bottom portion of a cavity, defined by the radiant wall 25 and the vertical insulating wall 16, as well as end wall 12 and a like end wall (not shown) is an inner wall or partition 29, the upper portion of which conforms generally to the shape of the radiant wall 25 except that it merges into a flat, vertical portion extending throughout the lower portion of the cavity. The lower edge of the wall 29 is supported by a burner supporting floor plate 20 which also forms the support for the lower edge portion of the wall 25.

Between the wall 25 and wall 29 is a radiant wall heating passageway 30 which is progressively more narrow as it extends from the bottom to the top of the cavity. Thus, air which heats the radiant wall 25 will increase in velocity, due to the progressively upwardly decreasing cross-section of the heating passageway 30 as the air progresses upwardly from the bottommost portion of the cavity to the uppermost portion of the passageway. This concept, as explained in the parent application Ser. No. 07/702,109, provides for the uniform heating of the radiant wall 25.

Spaced outwardly toward wall 11 is an insulated, flat, rectangular wall 31 which is disposed parallel to and outwardly of the partition or wall 29. The two walls 29 and 31 extend the length of the oven and define a vertically and longitudinally extending passageway 32, through which heated air passes in a downward path, as indicated by the arrow 33 and, the air then passing outwardly through bottom openings 36 in the wall 29.

Wall 31 serves a double function of providing a partition between a combustion chamber 35 and the passageway 32. The outer wall of the combustion chamber 35 is defined by an insulating block 37 on the vertical insulation panel 16. End insulation panels, such as insulation panel 39 are provided at the ends of the combustion chamber, these panels being supported by the end walls, such as end wall 12. The combustion or incineration chamber 35 is, therefore, defined by the plate 20 and by the upstanding insulation block 37, insulation wall 31, and end walls 39. At the upper extremity of the vertical combustion chamber 35 there is provided a pair of brackets 41 which support a semi-cylindrical, downwardly concaved cap 40 which is provided with a plurality of ports 42.

Figure 5:
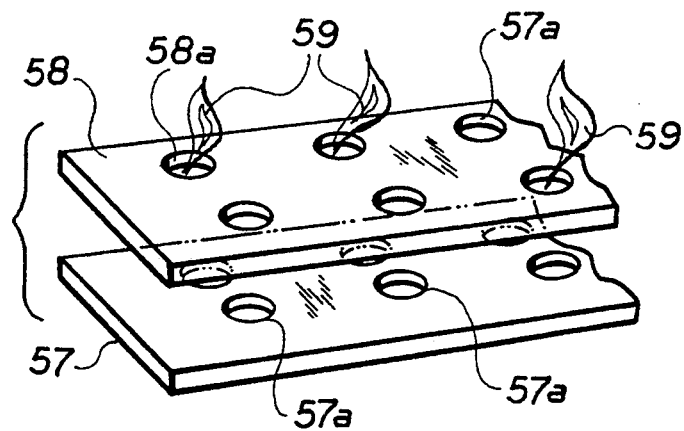
FIG. 5 is an exploded fragmentary, perspective view of the burner plates of the burner in the combustion chamber of the oven of FIG. 1.
Figure 6:
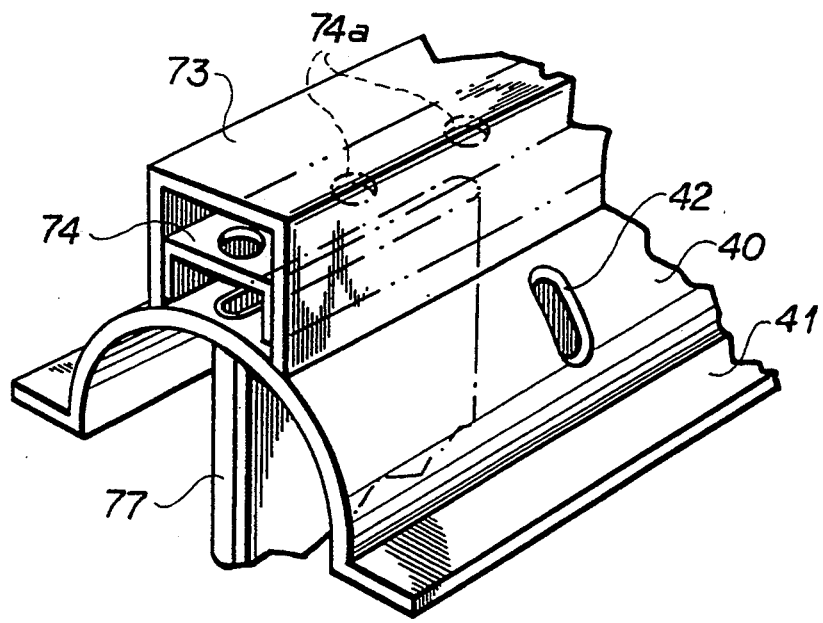
FIG. 6 is an enlarged fragmentary perspective view of the cap and header of the oven shown in FIG. 1.
Figure 7:
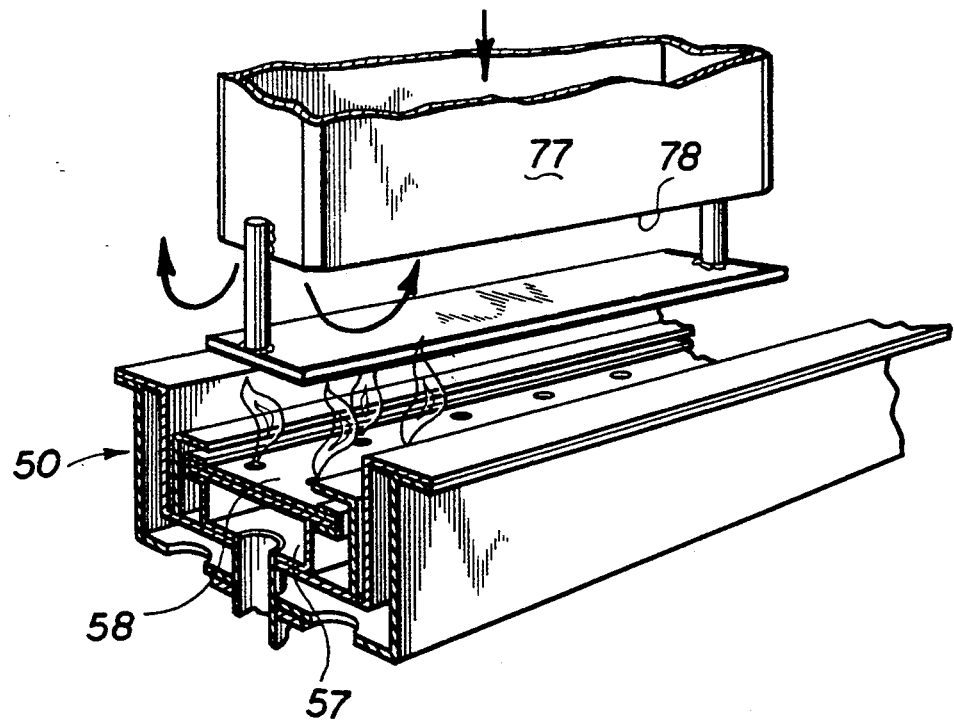
FIG. 7 is an enlarged fragmentary perspective view of the burner and the discharge end of the heat exchanger tubes of the oven shown in FIG. 1.

Within the lower portion of the combustion chamber 35 and sitting on the burner support plate 20 preferably wholly inside the combustion chamber 35 is a longitudinally extending linear gas burner 50 which is constructed in accordance with the teachings of my U.S. Pat. No. 5,062,788. This linear burner 50 has a longitudinally extending gas pipe 51 provided with one or more longitudinally spaced, upstanding venturi mixing tubes 52. These mixing tubes 52 feed the gas from gas conduit 51 and primary air from a longitudinally extending air plenum or chamber 53 to the horizontal, flat, juxtaposed lower and upper burner plates 57 and 58 which extend the length of the longitudinally extending linear burner 50. The plates 57 and 58 have offset holes 57a and 58a seen in FIG. 5 and are in a U-shaped trough which contains the spaced, longitudinally aligned rows of individual flames 59. The spaced aligned flames 59 are created by gas and air passing through the aligned longitudinally equally spaced holes 58a in outer or upper plates 58 of the linear burner 50 and are distributed along the length of the upper portion of the burner 50 of the flames 59. There can be one or more longitudinal rows of holes 58a.

Access to the burner 50 is provided through aligned access doors 55, wall 29, and partition 30 in one of the side panels 12, the burner 50 having an external blower 60 which delivers ambient air to the air plenum or chamber 53.

The polluted air comprising the air from within the central oven cavity 15 and the VOC's are withdrawn by a blower 90, or a plurality of such blowers from the oven cavity 15 and is delivered via a conduit 61a to a downwardly extending air intake duct or conduit 61, which protrudes down through top plate 13 and panel 13a. This conduit or duct 61 protrudes into the plenum chamber 45 and terminates at the center of an upper, flat, top plate 63a of a horizontally disposed, longitudinally extending primary header 63 so that the duct 61 communicates with the central upper portion of header 63. The header 63 extends throughout substantially the longitudinal length of the plenum chamber 45 and is fixed in a horizontal position, the header 63 being closed, at its ends. Header 63 is a square, tubular member, in cross-section.

At spaced intervals along the length of the bottom plate 63b of the primary header 63, are a plurality of flexible, downwardly protruding, conduits or ducts 72. The upper end portions of ducts 72 all communicate with the single primary header 63 while each of the flexible conduits 72 communicates with its individual secondary header 73.

Figure 2:
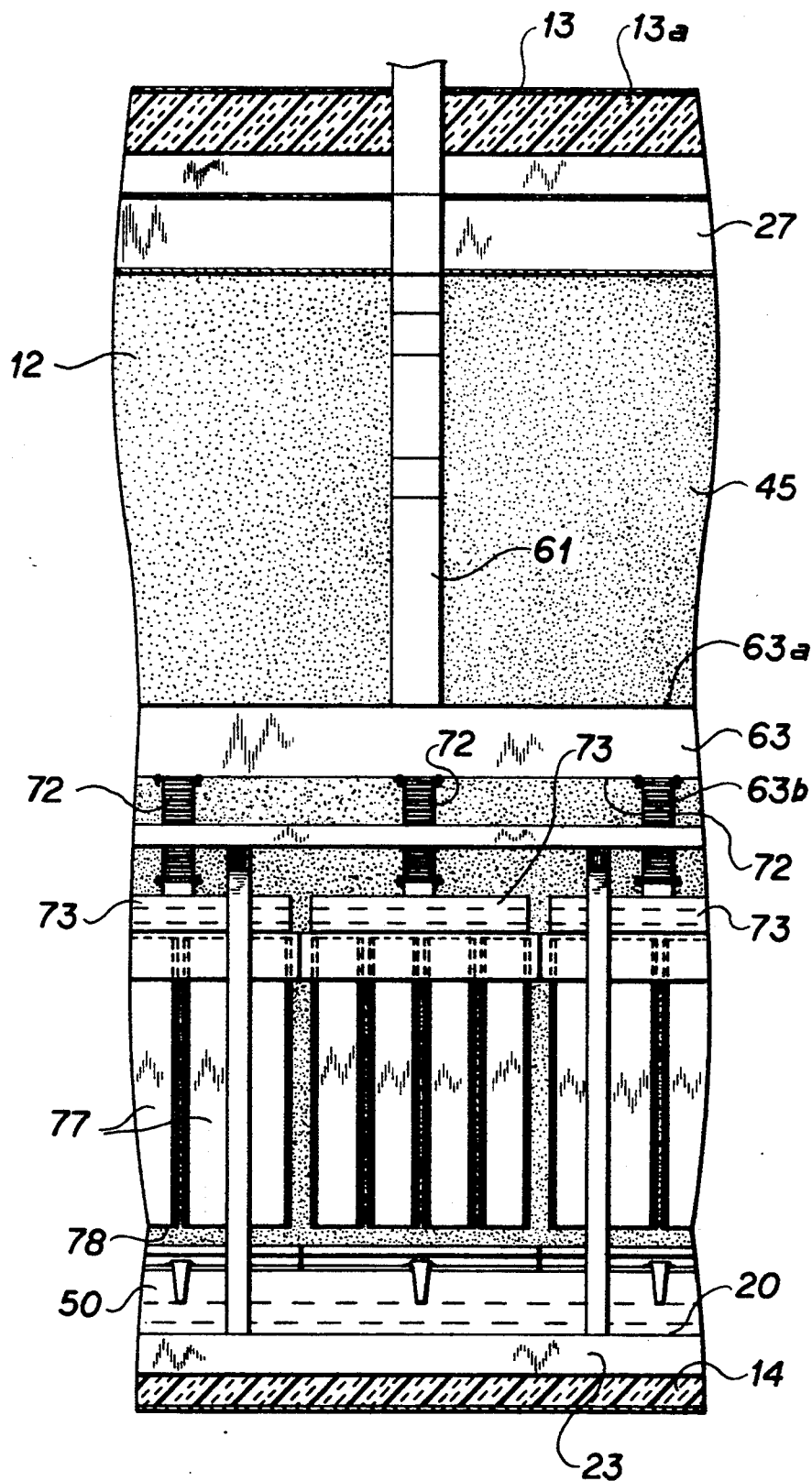
FIG. 2 is a vertical, longitudinal, sectional view of a portion of the oven depicted in FIG. 1.
Figure 3:
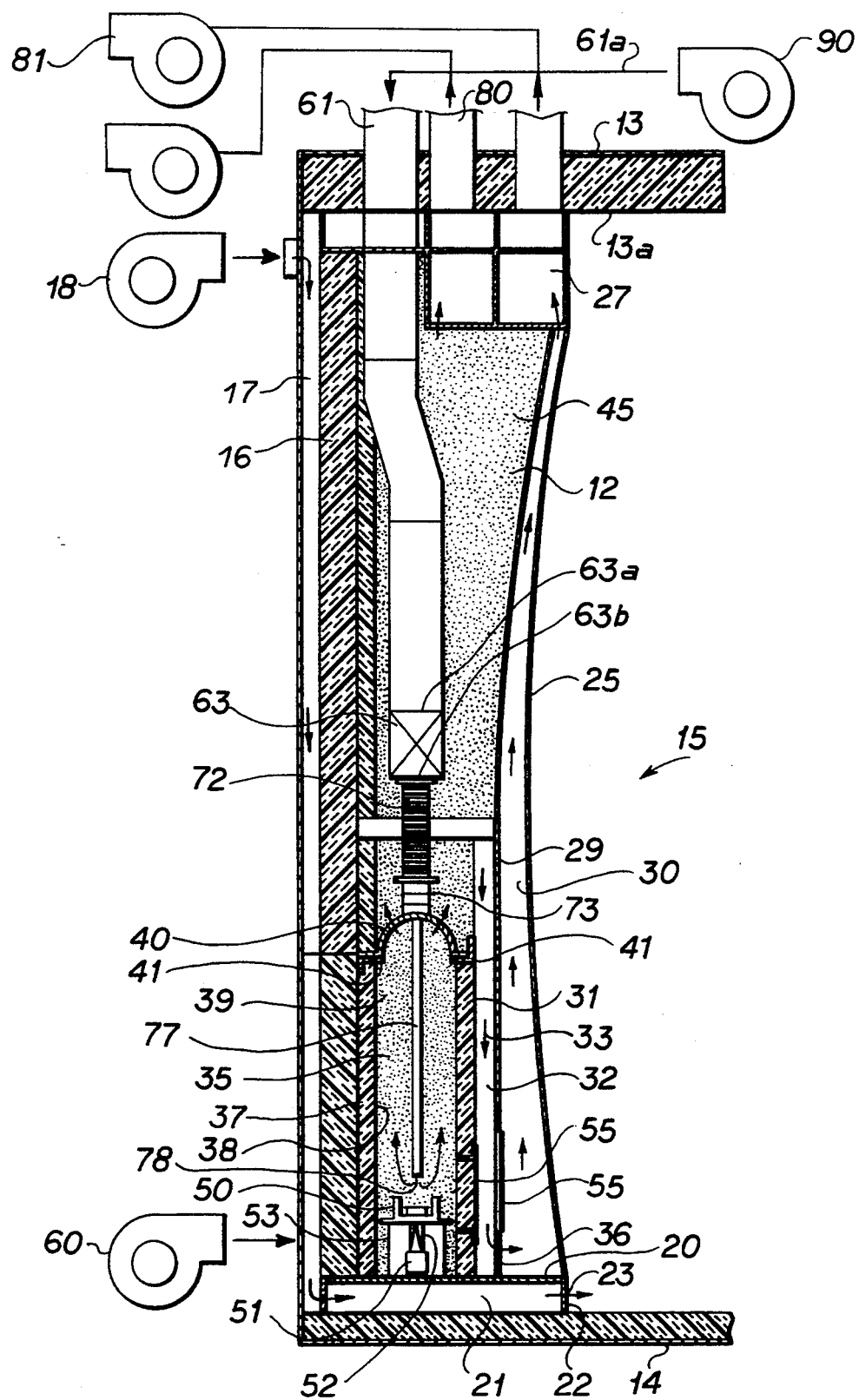
FIG. 3 is a transverse sectional view of a portion of the oven shown in FIGS. 1 and 2, the blowers thereof being shown schematically.

Headers 73 are arranged in horizontal, longitudinal alignment below and parallel to the primary header 63. A horizontal diffusion plate 74 is provided within each header 73, this diffusion plate 74 being provided with a plurality of longitudinally spaced holes 74a. Each header 73 is generally a square tubular member having a top plate and side plates, the lower edges of all secondary headers 73 are welded to the upper central surface of a single semi-cylindrical, downwardly concaved, longitudinally extending combustion chamber cap 40 which extends outwardly of the headers 73 on both ends, as seen in FIG. 2. This combustion chamber cap 40 is arcuate about a longitudinal, horizontal, central axis. The lower surface of the cap 40 is thus concaved and the upper surface of cap 40 is convexed.

On opposite sides of the cap 40 there are provided a plurality of longitudinally spaced, elongated holes or slots 42, through which air may readily pass from the combustion or incineration chamber 35 into the plenum chamber 45, thereabove.

The bottom portion of each header 73 is provided with a recuperative heat exchanger having a plurality of longitudinally aligned, long, narrow, rectangular holes (not shown) which are aligned axially, therealong. Through these rectangular holes (not shown) respectively protrude a like number of long, narrow, rectangular, heat exchanger tubes or conduits 77 which have upper flanges, which are welded to the upper surface of the cap 40 within the headers 73. Each of the heat exchanger tubes or conduits 77 is rectangular in cross-section and is longitudinally elongated so as to provide open ended ducts, the lower discharge end 78 of which form a discharge mouth or port for discharging the air and combustibles in a downward direction into the lower central portion of the combustion chamber 35. It is thus seen that the heat exchanger tubes ducts 77 are suspended solely by their upper flanges which are welded to the cap 40, within each header 73. These suspended tubes 77 form a heat exchanger, within which the stream of polluted air and combustibles are heated.

At the upper end of the housing 10, adjacent to the air intake duct or conduit 61 and protruding through the top panel 14 is an air discharge duct or conduit 80. A portion of the air to be discharged from the interior of the plenum passes through this discharge conduit 80 to the atmosphere or to some facility which can use the heat. This air discharge conduit 80 is thus connected to a blower 81.

The heat exchangers, namely the heat exchanger tubes 77 are disposed midway between and parallel to the inner radiant emitter walls 38 of the partition 37. These upright, rectangular conduits 71 have their flat, opposed sides arranged in two parallel planes and disposed respectively opposite to the wall 37 and partition 31, the tubes 77 being midway between them and essentially along a common upright plane which is equidistant therebetween.

If desired, round or cylindrical tubes 177 in FIG. 4 may be substituted for the rectangular heat exchanger tubes 77. Actually, these round heat exchanger tubes are less effective than the rectangular tubes 77 but are, nevertheless, quite efficient due to the heat transfer characteristics of the enclosure around the tubes 77. In the preferred embodiment of the invention, the heat transfer tubes 77 have thin, flat, opposed sides arranged in two planes parallel to the burner, however these tubes can also be arranged in planes perpendicular or at other angles to the length of the burners.

OPERATION

From the foregoing description, the operation of the present invention should be apparent.

The blower 60 supplies air to the air plenum 52 of the burner 50. Gas is supplied from an external gas pipe (not shown) into the gas pipe 51. This gas travels up through the venturi tubes 53 and into the burner body of the burner 50, air from the air plenum 52 being mixed as primary air with gas so as to pass a combustible mixture through the holes 57a and plate 57 and thence laterally and up through the holes 58a in plate 58. This gas is ignited so as to create a plurality of small flames at each hole 58a. These holes 58a and hence the flames are aligned longitudinally and are respectively equally spaced from each other and therefore provide uniform flame and resulting heat throughout the length of the combustion or incineration chamber 35.

Air from the oven cavity 15 is delivered by the blower 60 to intake duct or conduit 61. This polluted air, containing the VOC's, is then passed downwardly in the duct 61 and thence into the central portion of the first header 63, moving longitudinally in both directions therein. Next, this air passes downwardly through the flexible conduit 72 and into each of a plurality of secondary headers 73. The air is then spread out again in these secondary headers 73 and delivered simultaneously to the upper end portions of the rectangular heat exchanger tubes 77. The polluted air then moves downwardly in all of these tubes, simultaneously, so as to be progressively discharged in the bottom portions or discharge ends 78 of the tubes. This polluted air is thus discharged from each of the discharge ends 78 in progressively moving, thin ribbons of air which impinge upon and commingle with the flames and with the gases of combustion moving upwardly from the burner 50. The polluted air is progressively heated from the time it enters the duct 61 which is enclosed within the air plenum until it is discharged from discharge ends 78. The heating primarily occurs in the combustion chamber and therefore the air emerging from the discharge ends 78 is at 800° F.–1000° F. As this air progressively travels along its downward path, the VOC's can be progressively oxidized as the temperature of the polluted air is raised; however, complete combustion (99%+) of the VOC's is accomplished when the polluted air is mixed with the products of combustion of the burner which can contribute secondary air for the complete burning of the burner fuel. At this stage, the polluted air is heated to between 1250° F. and 1500° F. and is passed along with the products of combustion in a upwardly direction moving along the outer surfaces of the heat exchanger tubes 77 and adjacent to the inner surfaces of the insulation 38 and 37 defining the combustion chamber 35. The inner surfaces of these insulations 37 and 38 therefore become radiating emitters which direct radiant heat generally directly against the side panels of the rectangular heat exchanger tubes. The side panels of these rectangular heat exchanger tubes are relatively wide with respect to the end panels which produce the rectangular tubes and are closely adjacent to each other so that these side panels occupy substantially the entire length of the heat exchanger and therefore are positioned to absorb a maximum amount of the radiated heat from the inner insulation surfaces as well as a maximum amount of the convection heat provided by the upwardly moving gases. Since the gases of combustion move in countercurrent flow upwardly along the outer surfaces of the tubes 77, as the polluted air moves downwardly therein, the coolest part of the heat exchanger tube is adjacent to the welds which secure the upper end portions of the heat exchanger in the secondary headers 73 and therefore subject the welds to a minimum of thermal stress and carbonization of the welds. Furthermore, due to the fact that the heat exchanger tubes are suspended, they are free to contract and expand both longitudinally and transversely without generating stresses on other parts in the combustion chamber.

The radiant energy generated by the opposed walls 37 and 38 which are parallel to the walls of the heat exchanger, enable the radiant energy to be absorbed and readmitted until the radiant energy is substantially absorbed by the heat exchanger. The products of combustion, which pass upwardly in the combustion chamber 35 pass out of the slots or holes in the cap 40 and pass into the upper plenum 12. At this stage, the products of combustion and air are relatively hot and therefore continue progressively to heat the primary header 63 and the conduit or duct 61 thereby imparting still additional heat to the incoming polluted air.

A part or all of the air delivered to the upper plenum 12 is directed downwardly in a flat, longitudinally extending passageway 32 and thence passes into the bottom portion of a progressively narrowing, upwardly extending passageway which enables the gases to uniformly heat the radiant wall 25, throughout its longitudinal length. Because the passageway 30 between the walls 28 and 25 become progressively more narrow as it progresses upwardly, the velocity of the air is progressively increased in its upward travel, thereby enabling progressively more heat to be delivered by the progressively lower temperature gases so that the gases are coolest as they emerge into the discharge plenum 27. The gases then move out of the plenum and into a discharge conduit 91 which delivers the air to the atmosphere.

Make-up air from the atmosphere is delivered by a blower 18 along the passageway 17 and the passageway 21 so as to be discharged into the bottom portion of the oven cavity 15.

By regulating the blowers 60, 81, 18, and 90, a positive, neutral, or negative pressure can be maintained in the oven cavity 15, as desired. Furthermore, the amount of make-up air desired can be delivered by changing the speed of the blower 18. Furthermore, the temperature of the air used to heat the radiant walls 25 can be regulated by regulating the amount of gas introduced to the burner or by increasing or decreasing the discharge of the gases from the upper cavity 12. The gases are discharged from the upper cavity 12 into duct 95 which extends substantially the length of the radiant wall. Duct 96 interconnects to duct 95 for expelling the hot gases that are in excess of those required to heat the radiant wall 25. Thus, the desired temperature of the radiant wall 25 can be maintained by increasing the fuel supply to the burner when the radiant wall 25 is below the desired temperature or the hot gases can be discharged directly from the upper chamber 12 through ducts 95 and 96 when the wall exceeds the desired temperature. This concept provides for control of the radiant wall temperature while at the same time assures that the minimum temperature required to oxidize the VOC's in chamber 35 is always maintained.

The length of travel of the discharged, polluted air in the combustion chamber 35 is sufficient, regardless of the speed of the blower 60 in delivering the air, to permit a dwell time of between 0.2 and 1 second as it travels from the vicinity of the burner to exit of the combustion chamber. Therefore, complete oxidation of the VOC's is quite readily and easily accomplished.

The temperature within the combustion chamber is maintained at about 1250° F. to about 1500° F. so as to insure the complete oxidation of all of the VOC's.

It will be obvious to those skilled in the art that many variations may be made in the embodiment here chosen for the purpose of illustrating the present invention, without departing from the scope thereof as defined by the appended claims.

I claim:

1. A self incinerating oven:
   (a) a housing;
   (b) a radiant wall within said housing, said radiant wall having an inner surface for defining at least in part an oven cavity, through which objects to be dried or cured are passed, said objects incidentally releasing volatile organic compounds into said oven cavity, and an outer surface;
   (c) an exhaust system for removing the polluted air containing the volatile organic compounds from said oven cavity;
   (d) an incineration chamber contained within said housing;
   (e) a burner within said chamber for heating gases in said chamber;
   (f) a recuperative type of heat exchanger contained within said incineration chamber;
   (g) said exhaust system including a conduit for directing the polluted air containing volatile organic compounds through the recuperative heat exchanger and thence in preheated condition into the incineration chamber such that the volatile organic compounds are oxidized within said incineration chamber; and
   (h) a means for directing the hot gases from the incineration chamber against said outer surface for heating by heat transfer through said radiant wall, the inner surface of said radiant wall of the oven.

2. The self incinerating oven defined in claim 1 including a heat exchanger within said incineration chamber in which the discharge ends of the tubes are free to expand in the direction of flow and the discharge of the polluted air from the tubes is directly into the incineration chamber.

3. The self incinerating oven defined in claim 1 wherein said means for heating includes a burner for generating a flame in said combustion chamber.

4. The self incinerating oven defined in claim 3 including a linear burner longitudinally across said incineration chamber.

5. The self incinerating oven defined in claim 4 wherein said heat exchanger includes a plurality of tubular members arranged in juxtaposition, said tubular members having discharge openings at their terminal ends for directing the polluted air toward the flames of said burner.

6. The self incinerating burner defined in claim 5 wherein said burner is a linear burner and provides a plurality of longitudinally spaced, individual flames along the longitudinal length of said combustion chamber, said tubular members providing a thin stream of air across the flame of said burner.

7. The self incinerating oven defined in claim 1 wherein said heat exchanger includes a plurality of tubes disposed within said incineration chamber, the lower ends of tubes directing said polluted air toward said burner.

8. A self incinerating oven comprising:
   (a) a housing;
   (b) a radiant wall within said housing for defining at least in part an oven cavity through which objects to be dried or cured are passed, said objects incidentally releasing volatile organic compounds into said oven cavity;
   (c) an exhaust system for removing the polluted air containing the volatile organic compounds from said oven cavity;
   (d) a fuel fired incineration chamber contained within said housing;
   (e) a recuperative type of heat exchanger contained within said incineration chamber;
   (f) said exhaust system including a directing the polluted oven exhaust air containing volatile organic compounds through the recuperative heat exchanger into the incineration chamber such that the volatile organic compounds are oxidized within said incineration chamber;
   (g) a means for directing the hot gases from the incineration chamber for heating the radiant wall of the oven; and
   (h) said heat exchanger including a plurality of juxtaposed tubes, and a header for supporting said juxtaposed tubes in a vertical position within said heat exchanger.

9. The self incinerating oven defined in claim 8 including a plurality of headers disposed in longitudinal alignment, each of said headers supporting groups of said heat exchanging tubes suspended therefrom.

10. The self incinerating oven defined in claim 8 including a primary header and a plurality of secondary headers disposed below said primary header and means connecting said primary header to said secondary headers, said secondary headers supporting a plurality of said tubes by their upper ends, said tubes extending into said combustion chamber and discharging from their lower ends said polluted toward said burner.

11. A self incinerating oven comprising;
   (a) a housing;
   (b) a radiant wall within said housing for defining at least in part an oven cavity, through which objects to be dried or cured are passed, said objects incidentally releasing volatile organic compounds into said oven cavity;
   (c) an exhaust system for removing the polluted air containing the volatile organic compounds from said oven cavity;
   (d) a fuel fired incineration chamber contained within said housing;
   (e) a recuperative type of heat exchanger contained within said incineration chamber;
   (f) said exhaust system including a conduit for directing the polluted oven exhaust air containing volatile organic compounds through the recuperative heat exchanger and into the incineration chamber such that the volatile compounds are oxidized within said incineration chamber;
   (g) a means for directing the hot gases from the incineration chamber for heating the radiant wall of the oven; and
   (h) said heat exchanger including a plurality of vertically disposed rectangular tubes suspended in said incineration chamber; and
   (i) emitters having surfaces on opposite sides of said tubes, said emitters being heated in said incineration chamber for emitting radiant energy toward said tubes.

12. The self incinerating oven defined in claim 1 wherein said radiant wall for said oven cavity is concaved throughout substantially its entire length, a partition spaced outwardly from said radiant wall and forming with said oven a passageway therebetween, and means for directing the products of combustion from said incineration chamber into one end portion of said passageway.

13. The self incinerating oven defined in claim 12 wherein said passageway tapers upwardly so as to progressively increase the velocity of said products of combustion.

14. The self incinerating oven defined in claim 1 including a plenum chamber above said combustion chamber, and said exhaust system including a duct passing through said plenum chamber for delivering polluted air to said heat exchanger.

15. The self incinerating burner defined in claim 14 including means for discharging said the products of combustion from said plenum chamber toward said radiant wall.

16. The self incinerating oven defined in claim 15 including means for selectively discharging the products of combustion from said plenum chamber and from the area adjacent to said radiant wall.

17. A process for heating an oven and for incinerating combustible materials which are released by objects within said oven, comprising:
   (a) passing objects successively through said oven cavity, for heating said objects within an oven cavity, whereby said objects release combustible compounds into the air within said oven cavity to provide polluted air;
   (b) producing heated products of combustion;

(c) commingling said polluted air and heated products of combustion so that said combustible materials are oxidized to provide heated air;

(d) directing at least a portion of said heated air for heating said oven cavity; and (e) passing said heated products of combustion in countercurrent flow past said polluted air for preheating said polluted air.

18. A self incinerating oven for drying objects disposed within an oven cavity whereby the air in said cavity is polluted by combustible materials, to produce polluted air as said object is dried, comprising:

(a) a housing having an oven within said housing and within which said object is placed;

(b) a combustion chamber within said housing;

(c) means for directing the polluted air progressively from said oven cavity to said combustion chamber;

(d) a burner for producing products of combustion and for progressively heating said polluted air as it travels into said combustion chamber and for intermixing said polluted air and the products of combustion from said burner in said combustion chamber to a temperature of between about 1250° F. and about 1500° F. for oxidizing the combustible constituents of said polluted air and for commingling the oxidized portion and the air with the products of combustion of said burner in said combustion chamber; and (e) means for passing the mixed air from said combustion chamber in countercurrent flow with respect to said polluted air for progressively heating said polluted air as said mixture is cooled by said polluted air and for delivering said mixture to the vicinity of said oven cavity for heating said oven cavity.

19. The apparatus defined in claim 18 wherein said oven cavity includes a radiant wall oven and wherein the mixture is directed against one side of said radiant wall for causing said radiant wall to emit radiant heat from the other side thereof, against the object in said oven cavity.

20. The self incinerating oven defined in claim 18 including a heat exchanger within said incineration chamber, said heat exchanger having tubes with exterior walls which are coated with a high temperature material to increase the emissivity.

21. A self incinerating oven comprising:

(a) a housing;

(b) a radiant wall within said housing for defining at least in part an oven cavity, through which objects to be dried or cured are passed, said objects incidentally releasing volatile organic compounds into said oven cavity;

(c) an exhaust system for removing the polluted air containing the volatile organic compounds from said oven cavity;

(d) a fuel fired incineration chamber contained within said housing;

(e) a recuperative type of heat exchanger contained within said incineration chamber;

(f) said exhaust system including a conduit for directing the polluted oven exhaust air containing volatile organic compounds through the recuperative heat exchanger into the incineration chamber such that the volatile organic compounds are oxidized within said incineration chamber for producing hot gases;

(g) a means for directing the hot gases from the incineration chamber for heating the radiant wall of the oven; and (h) said heat exchanger having tubes; and (i) a porcelain coating along the surface of said tubes.

22. A self incinerating oven comprising:

(a) a housing:

(b) a radiant wall having two opposed surfaces within said housing, one surface of which defines at least in part an oven cavity, through which objects to be dried or cured are passed, said objects incidentally releasing volatile organic compounds into said oven cavity;

(c) an exhaust system for removing the polluted air containing the volatile organic compounds from said oven cavity;

(d) said housing defining an incineration chamber into which the products of combustion are introduced;

(e) a fuel fired burner for producing products of combustion incineration chamber;

(f) a recuperative type of heat exchanger contained within said incineration chamber:

(g) said exhaust system including a conduit for directing the polluted air containing volatile organic compounds through the recuperative heat exchanger and into the incineration chamber such that the volatile organic compounds are oxidized within said incineration chamber; and (h) means for directing the hot gases from the incineration chamber against the other surface of said radiant wall for heating the radiant wall.

23. The self incinerating oven defined in claim 22 wherein said heat exchanger includes a plurality of juxtaposed tubes each having an inlet and a discharge end, the inlet ends of said tubes communicating with said conduit so that said polluted air passes through all discharge tubes and is discharged from the discharge ends into said combustion chamber.

24. The self incinerating oven defined in claim 23 wherein said tubes are supported within said incineration chamber so that the movement of said tubes is unobstructed for permitting sa tubes to expand and contract freely in the direction flow of said polluted air.

25. A self incinerating oven comprising:

(a) a housing;

(b) a radiant wall disposed within said housing, said radiant wall having a first radiant surface and a second surface, said radiant wall defining in part an oven cavity for drying objects placed therein, said objects releasing combustible volatiles into the air in said cavity;

(c) said housing defining a chamber which receives therein, heated air at a temperature sufficient to oxidize said volatiles;

(d) conduit means for directing the air containing said volatiles from said cavity into said chamber for commingling with said heated air and for being oxidized therein by said heated air in said chamber, and for producing a mixture of heated air and the volatiles which have been oxidized within said chamber; and (e) means for directing said air against said second surface of said radiant wall for heating said radiant wall sufficiently that said radiant surface radiates radiant heat for drying said object.

26. The self incinerating oven defined in claim 22 including a burner within said chamber for supplying said heated air.

27. The self incinerating oven defined in claim 25 including a heat exchanger within said chamber communicating with said conduit means so that the air containing said volatiles passes through said heat exchanger and thence into said chamber, said air with said volatiles being heated in said heat exchanger before it is discharged into said chamber.

28. The self incinerating oven defined in claim 27 including a burner having a flame within said chamber for supplying said heated air and wherein said heat exchanger includes a tube through which said air with volatiles passes, for being preheated, said tube having a discharge end which directs the preheated air directly onto the flame of said burner.

29. The self incinerating oven defined in claim 25 including a heat exchanger within said chamber, said heat exchanger having a plurality of tubes disposed in side-by-side relationship, said tubes having intake ends communicating with said conduit means and discharge ends through which said air with volatiles is discharged into said chamber and burner means adjacent to the discharge ends of said tubes, said burner means having flames for supplying said heated air, said discharge ends being sufficiently close to said flames that the volatiles are oxidized by said flames.

30. The self incinerating oven defined in claim 29 wherein said tubes are disposed vertically within said chamber and said burner is below said tubes and spaced from but adjacent to said discharge ends.

31. The self incinerating oven defined in claim 30 wherein said tubes are aligned with each other so that their ends terminate at about the same height in said chamber and wherein said burner is a linear burner having flames adjacent to said discharge ends.

32. A self incinerating oven of the type having a housing defining an oven cavity in which an object to be dried or cured is placed, a source of gas, a combustion chamber adjacent to said oven cavity, a gas burner within said combustion chamber receiving and burning said gas for supplying products of combustion and heated air for heating said oven cavity, and exhaust means for removing air from said oven cavity together with volatiles which may be given off from said object as it is heated in said oven cavity, the improvement comprising:
a heat exchanger disposed in said combustion chamber, said heat exchanger having a discharge tube provided with an upper intake end communicating with said exhaust means for receiving the air and any combustibles carried by the air from said oven cavity, and a lower discharge end above and adjacent to said gas burner for discharging the air from said discharge tube onto the burner, said gas burner simultaneously burning said combustibles and said gas.

33. The self incinerating oven comprising:
(a) a housing;
(b) a radiant wall within said housing, said radiant wall having a radiant surface for defining at least a portion of an oven cavity, in which an object is to be dried or cured is placed, said object incidently releasing volatile organic compounds into said oven cavity when said radiant wall is heated, said radiant wall also having an inner surface for receiving heat for heating said radiant wall:
(c) an exhaust system for removing polluted air which has been polluted by said volatile organic compounds from said oven cavity;
(d) said housing defining an incineration chamber;
(e) a burner for said incineration chamber for burning fuel supplied to said burner for providing products of combustion within said incineration chamber for heating said inner surface of said radiant wall;
(f) a recuperative type heat exchanger having an intake end and a discharge end, said heat exchanger being disposed within said incineration chamber, said exhaust system communicating with said intake end for discharging the polluted air, withdrawn from said oven cavity, into said heat exchanger, the discharge end of said heat exchanger communicating with said combustion chamber for discharging the preheated polluted air into said incineration chamber for being commingled with said products of combustion and for being oxidized therein; and
(g) means for directing the commingled products of combustion and the oxidized polluted air against said inner surface of said radiant wall for heating said radiant wall sufficiently for the inner surface of said radiant wall to cause said radiant wall to generate radiant energy directed toward said object.

34. The self incinerating oven defined in claim 33 wherein said means for directing the commingled products of combustion are oxidized polluted air against said inner surface of said radiant wall includes walls within said housing for defining with said radiant wall, a plenum chamber surrounding a portion of said combustion chamber, said combustion chamber discharging into said plenum chamber.

35. The self incinerating oven defined in claim 34 including a cap extending horizontally along the upper portion of said combustion chamber and provided with ports through which the products of combustion are discharged into said plenum chamber.

36. The self incinerating oven defined in claim 34 wherein said heat exchanger includes a header disposed horizontally between said plenum chamber and said combustion chamber and through which said polluted air passes, and a plurality of parallel juxtaposed hollow tubes suspended by their upper ends from said header for directing said polluted air from said header, said tubes extending downwardly within said combustion chamber for discharging the directed polluted air toward said burner.

37. The self incinerating oven defined in claim 33 wherein said tube is vertically disposed and suspended by its intake end in said combustion chamber.

38. The self incinerating oven defined in claim 33 including a header and a plurality of additional tubes, said additional tubes being disposed adjacent to said tube and each having an intake end and a discharge end, all of the intake ends being connected to said heater and said heater communicating with said exhaust means.

39. The self incinerating oven defined in claim 38 wherein said burner produces flames and wherein the discharge ends of all of the tubes are above and adjacent to said flames.

* * * * *